(12) United States Patent
Koo

(10) Patent No.: US 7,739,010 B2
(45) Date of Patent: Jun. 15, 2010

(54) ELECTRONIC CONTROL SYSTEM FOR VEHICLE AND CONTROL METHOD THEREOF

(75) Inventor: Bon Gyeong Koo, Gyeonggi-do (KR)

(73) Assignee: Mando Corporation, Seoul (KR)

( * ) Notice: Subject to any disclaimer, the term of this patent is extended or adjusted under 35 U.S.C. 154(b) by 546 days.

(21) Appl. No.: 11/716,391

(22) Filed: Mar. 9, 2007

(65) Prior Publication Data

US 2007/0265748 A1    Nov. 15, 2007

(30) Foreign Application Priority Data

May 9, 2006    (KR) ...................... 10 2006 0041279

(51) Int. Cl.
*B60G 17/018*    (2006.01)
(52) U.S. Cl. .............................. 701/37; 701/36; 701/48
(58) Field of Classification Search .................. 701/36, 701/37
See application file for complete search history.

(56) References Cited

U.S. PATENT DOCUMENTS

| 6,909,944 | B2 * | 6/2005 | Pillar et al. ..................... 701/1 |
| 2004/0039510 | A1 | 2/2004 | Archer et al. ................. 701/48 |

FOREIGN PATENT DOCUMENTS

| JP | 10-086769 | 4/1998 |
| JP | 2000-335331 | 12/2000 |
| JP | 2000-339001 | 12/2000 |
| JP | 2005-088841 | 4/2005 |
| JP | 2006-101430 | 4/2006 |

* cited by examiner

*Primary Examiner*—Khoi Tran
*Assistant Examiner*—Brian J Broadhead
(74) *Attorney, Agent, or Firm*—McDermott Will & Emery LLP

(57) ABSTRACT

The present invention relates to an electronic control system for a vehicle and a control method thereof, wherein communication is made between a main controller and at least one local controller to control a brake apparatus and a suspension apparatus in consideration of information of the controllers, thereby further improving and activating unique features of the respective controllers as well as simplifying the system. An embodiment of the present invention provides an electronic control system for a vehicle having a main controller for receiving vehicle information and creating and outputting a brake control signal and a suspension control signal for a vehicle; at least one local controller for controlling a damper of each wheel according to the suspension control signal outputted from the main controller; and an interface unit for performing data communication between the main controller and the local controller.

4 Claims, 3 Drawing Sheets

ELECTRONIC CONTROL SYSTEM FOR VEHICLE AND CONTROL METHOD THEREOF

BACKGROUND OF THE INVENTION

1. Field of the Invention

The present invention relates to an electronic control system for a vehicle and a control method thereof, and more particularly, to an electronic control system for a vehicle and a control method thereof, wherein communication is made between a main controller and at least one local controller to control a brake apparatus and a suspension apparatus in consideration of information of the controllers, thereby further improving and activating unique features of the respective controllers as well as simplifying the system.

2. Description of the Related Art

An electronic control system for a vehicle is currently an important issue of development companies, and many studies thereon have been conducted.

As shown in FIG. 1, such an electronic control system comprises an electronic stability program (ESP) controller 10 for a brake apparatus, a continuous damping control (CDC) controller 20 for a suspension apparatus, a tire pressure monitoring system (TPMS) controller 30 for a low tire pressure alarm system, and an interface unit 40 for performing communication among the respective controllers 10, 20 and 30.

Here, the ESP controller 10 receives information from a wheel speed sensor 1, a steering angle sensor 2, a yaw-rate sensor 3, a lateral acceleration sensor 4 and a brake pressure sensor 5, and controls a brake control unit 6 and an engine control unit 7.

The CDC controller 20 for a suspension apparatus receives information from a vehicle body acceleration sensor 21, a wheel acceleration sensor 22, a steering angle or yaw-rate sensor 23 and a lateral acceleration sensor 24, and controls a damper control unit 25.

The TPMS controller 30 for a low tire pressure alarm system transmits tire pressure information of a tire pressure sensor 31 to a controller having a receiver in a radio frequency (RF) transmission manner and displays the tire pressure information on a display unit 32. Accordingly, a driver can confirm the tire pressure information.

In this manner, the electronic control system merely exchanges the information, which is received from the sensors connected to the controllers 10, 20 and 30, with the controllers. Thus, even though the controllers 10, 20 and 30 are installed, they do not affect the performances of the others. That is, the electronic control system individually operates unique characteristics of each of the controllers 10, 20 and 30 using information received from a corresponding sensor.

Accordingly, since information required by each controller is received from a sensor connected to each controller and is then processed, sharable sensors (e.g., the steering angle sensor, the lateral acceleration sensor, and the wheel speed sensor) are redundantly used, leading to an increase in the unit cost of the system.

In addition, since sensors required by respective controllers are redundantly installed and controllers (e.g., the CDC controller) are installed individually so that the controllers can be operated independently, it is inefficient in that the inner configuration of the system is complicated and signal processing thereof is duplicated.

Further, in most of TPMSs, an RF receiver is mounted on the controller to receive information from a pressure sensor of each wheel. However, since frequency allocation bandwidth of each country is different from those of other countries, a receiving rate is lowered if a weak frequency is allocated.

BRIEF SUMMARY OF THE INVENTION

An embodiment of the present invention provides an electronic control system for a vehicle and a control method thereof, wherein communication is made between a main controller and at least one local controller to control a brake apparatus and a suspension apparatus in consideration of information of the controllers, thereby further improving and activating unique features of the respective controllers as well as simplifying the system.

Further, an embodiment of the present invention improves the efficiency of a receiving rate by receiving pressure information from a local controller close to a tire pressure sensor.

According to one embodiment, an electronic control system for a vehicle comprises a main controller for receiving vehicle information and creating and outputting a brake control signal and a suspension control signal for the vehicle; at least one local controller for controlling a damper of each wheel according to the suspension control signal outputted from the main controller; and an interface unit for performing data communication between the main controller and the local controller.

The main controller may receive vehicle information sensed by a steering angle sensor, a yaw-rate sensor, a lateral acceleration sensor and/or a brake pressure sensor, and the local controller may receive wheel information of the vehicle sensed by a wheel speed sensor and/or a tire pressure sensor.

The system may further comprise a display unit for displaying the vehicle information thereon, wherein the main controller may receive tire pressure information from the local controller connected to the tire pressure sensor and cause the tire pressure information to be displayed on the display unit.

The local controller may transmit wheel speed information sensed by the wheel speed sensor to the main controller through the interface unit.

The main controller may send the local controller a damper control amount determined by using state information of the vehicle received from a variety of sensors of the vehicle and/or the wheel information of the vehicle received from the local controller, and the local controller may control the damper according to the control amount received from the main controller.

According to another embodiment, a control method of an electronic control system for a vehicle comprises the steps of receiving state information of the vehicle from a sensor connected to a main controller and wheel information of the vehicle from a sensor connected to a local controller; and creating and outputting a brake control signal and a suspension control signal for the vehicle based on the received vehicle information.

The method may further comprise the step of receiving tire pressure information from the local controller connected to a tire pressure sensor and causing the tire pressure information to be displayed.

The local controller may receive the outputted suspension control signal and control a damper of each wheel.

DETAILED DESCRIPTION OF THE INVENTION

Hereinafter, an embodiments of the present invention will be described in greater detail with reference to the accompanying drawings.

Figure 2:
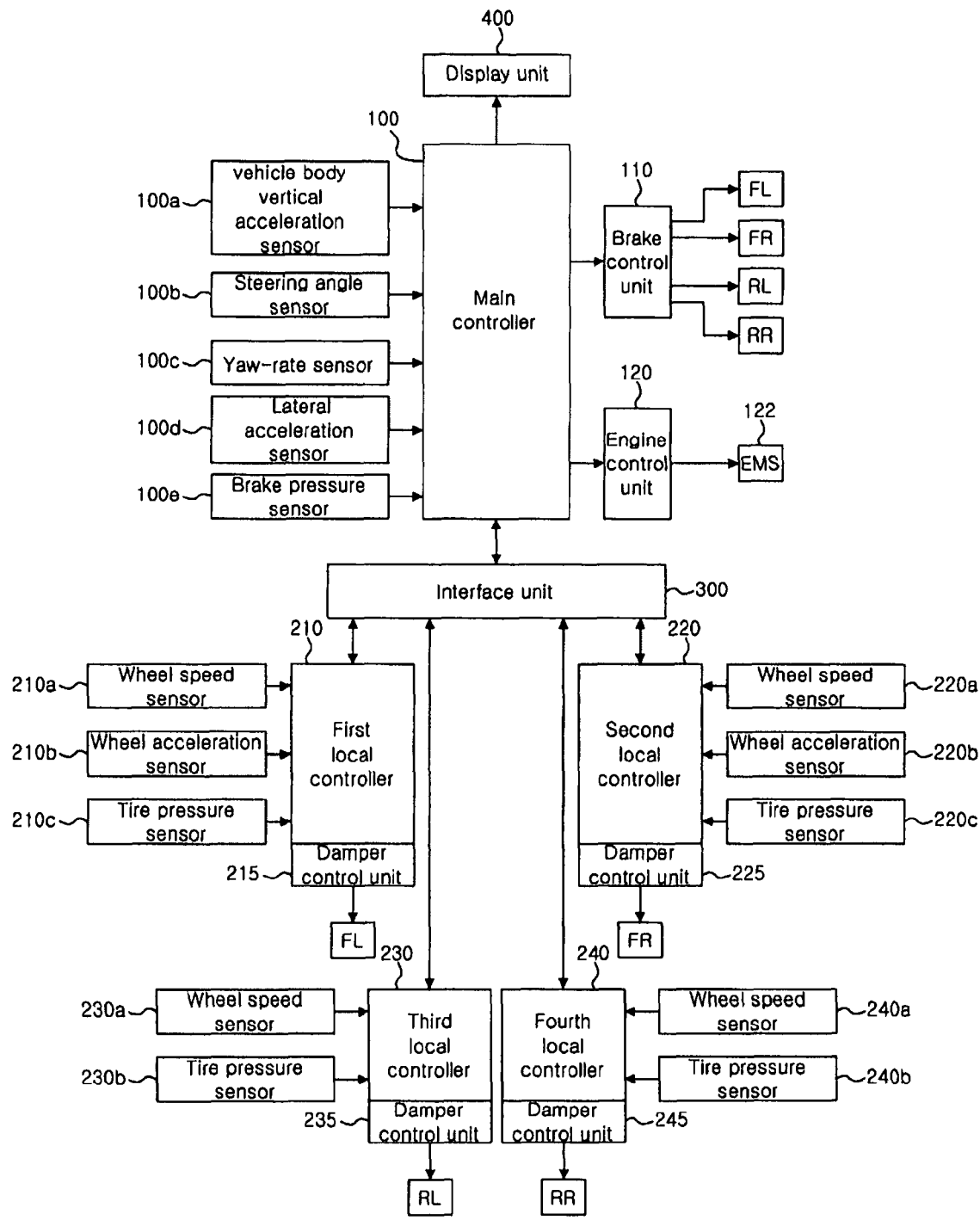
FIG. 2 is a block diagram showing an electronic control system for a vehicle according to an embodiment of the present invention.

FIG. 2 is a block diagram showing an electronic control system for a vehicle according to an embodiment of the present invention.

Referring to FIG. 2, the electronic control system for a vehicle comprises a main controller 100, first to fourth local controllers 210, 220, 230 and 240 (hereinafter, referred to as 'local controllers') connected to the main controller 100, and an interface unit 300 for performing communication between the main controller 100 and the local controllers 210, 220, 230 and 240. Here, the interface unit 300 refers to a controller area network (CAN).

In addition, the electronic control system for a vehicle of the illustrated embodiment of FIG. 2 further comprises a display unit 400 for displaying state information of the vehicle.

The main controller 100 receives vehicle information, and creates and outputs a brake control signal and a suspension control signal for the vehicle.

More specifically, the controller 100 creates a brake control signal and a suspension control signal using vehicle information sensed by a vehicle body vertical acceleration sensor 100a, a steering angle sensor 100b, a yaw-rate sensor 100c, a lateral acceleration sensor 100d, and a brake pressure sensor 100e, and wheel information (e.g., wheel speed information or tire pressure information) of the vehicle received from the local controllers 210, 220, 230 and 240.

In addition, the main controller 100 outputs the created brake control signal and suspension control signal to the local controllers 210, 220, 230 and 240 for controlling a brake control unit 110, an engine control unit 120 and dampers.

Accordingly, the brake control unit 110 controls brake pressure of each wheel according to the brake control signal outputted from the main controller 100. The engine control unit 120 controls the value of engine torque according to the brake control signal outputted from the main controller 100 and provides the value of engine torque to an engine management system (EMS) 122. The local controllers 210, 220, 230 and 240 control a control amount for a damper of each wheel according to the suspension control signal outputted from the main controller 100.

In addition, the main controller 100 receives tire pressure information from the local controllers 210, 220, 230 and 240 connected to tire pressure sensors 210c, 220c, 230b and 240b for sensing air pressure of a tire, and causes the tire pressure information to be displayed on the display unit 400. At this time, since the tire pressure information is received from a local controller close to a tire pressure sensor, the efficiency of a receiving rate can be improved.

The local controllers 210, 220, 230 and 240 are independent control apparatuses for dampers installed on respective wheels and control the dampers of the respective wheels under the control of the main controller 100.

In addition, the local controllers 210, 220, 230 and 240 provided in the respective wheels perform a fail-safe function if a failure occurs in relation with the main controller 100.

More specifically, the local controllers 210, 220, 230 and 240 transmit wheel information of the vehicle, which is sensed by wheel speed sensors 210a, 220a, 230a and 240a, wheel acceleration sensors 210b and 220b, and the tire pressure sensors 210c, 220c, 230b and 240b, to the main controller 100 through the interface unit 300.

Then, the main controller 100 determines control amounts for the dampers using state information of the vehicle sensed by the sensors connected directly to the main controller itself and wheel information of the vehicle received from the local controllers 210, 220, 230 and 240, and then transmits the determined control amounts to the local controllers 210, 220, 230 and 240.

Accordingly, the local controllers 210, 220, 230 and 240 output the control amounts received from the main controller 100 to damper control units 215, 225, 235 and 245, so that the dampers can be controlled.

The interface unit 300 is configured such that data communication can be made between the main controller 100 and the local controllers 210, 220, 230 and 240, in order to interface the wheel information of the vehicle from the local controllers 210, 220, 230 and 240 and the control signal created by the main controller 100.

In this manner, since the brake apparatus and the suspension apparatus are controlled in consideration of the information of the main controller and the local controllers through communication therebetween, production costs can be reduced and the system can be simplified.

Figure 1:
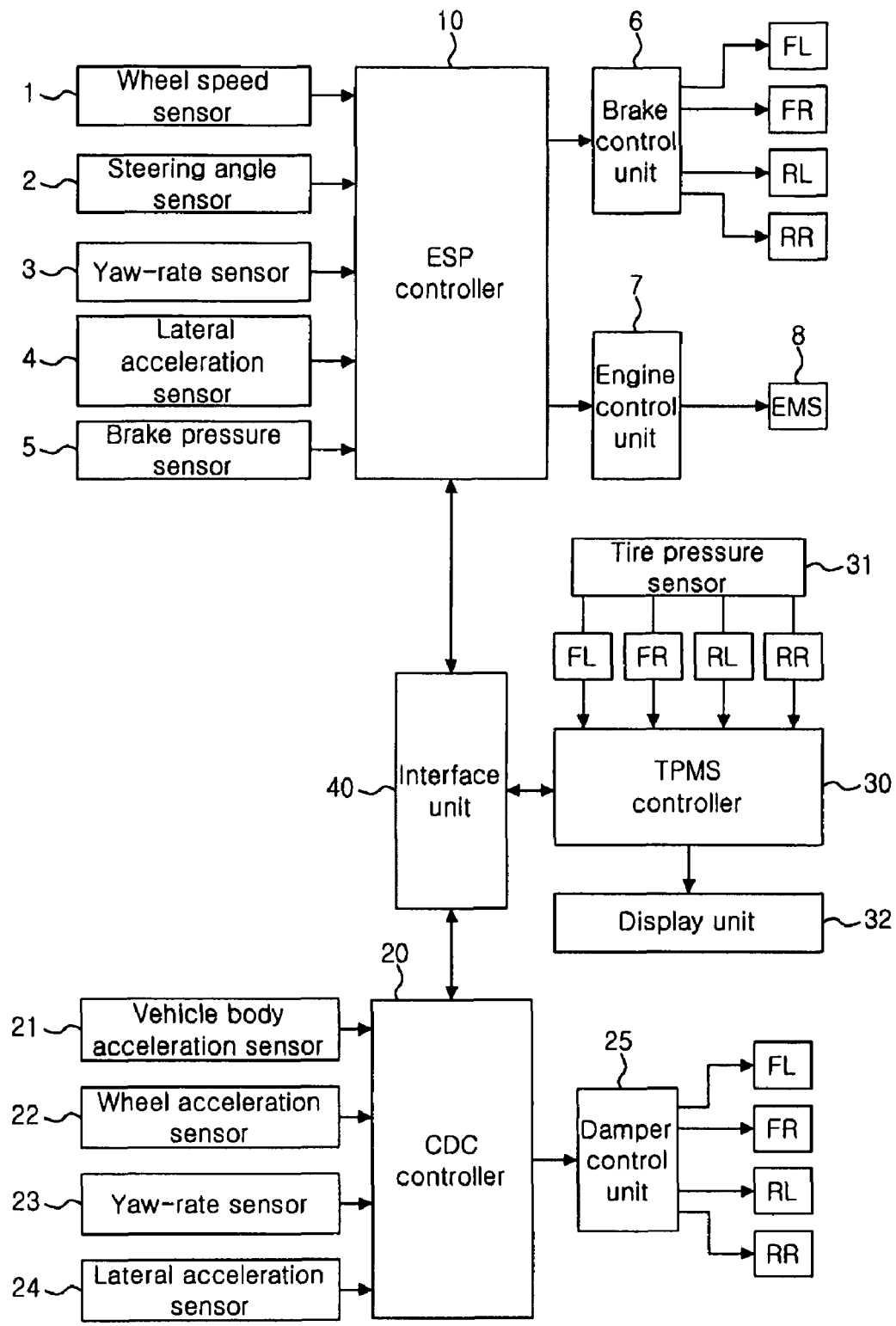
FIG. 1 is a block diagram showing a conventional electronic control system.

That is, the configuration comprising the ESP controller, the CDC controller, and the damper control unit of FIG. 1 is replaced with the main controller and the damper control unit, resulting in simplification of the system. The configuration comprising the CDC controller and the wheel acceleration sensor of FIG. 1 is replaced with the local controllers, resulting in reduction of production costs.

A control method of the electronic control system for a vehicle according to an embodiment of the present invention constructed as above will be described below.

Figure 3:
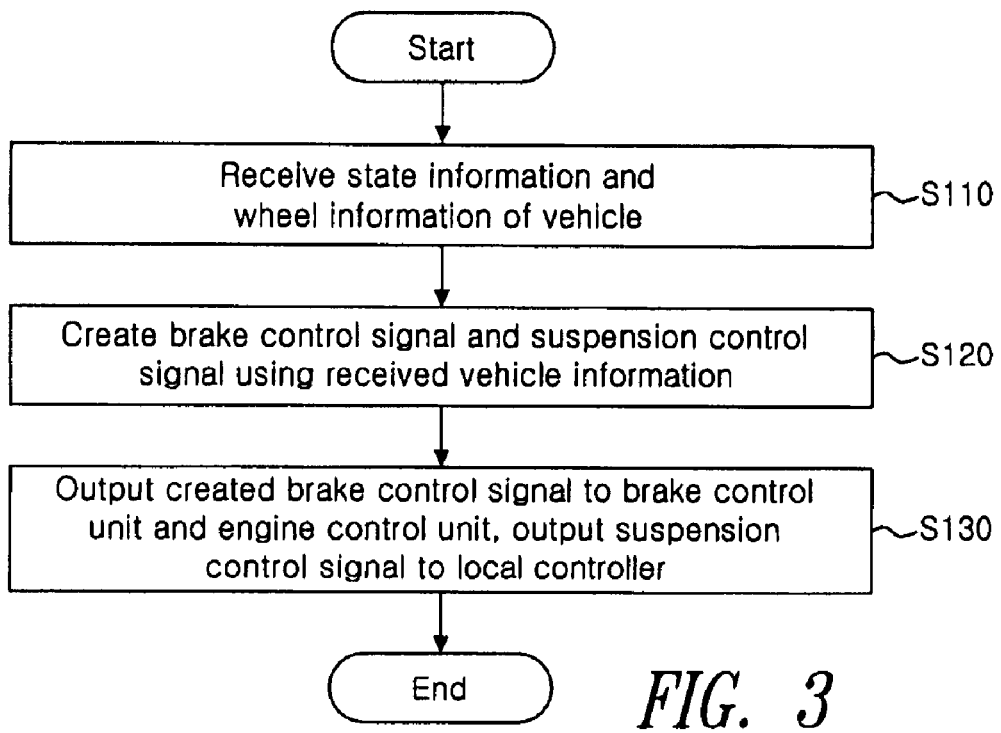
FIG. 3 is a flowchart illustrating a control method of a main controller in the electronic control system for a vehicle according to an embodiment of the present invention.

FIG. 3 is a flowchart illustrating a control method of the main controller in the electronic control system for a vehicle according to an embodiment of the present invention Referring to FIG. 3, the main controller 100 receives state information of the vehicle and wheel information of the vehicle (S110).

That is, the main controller 100 receives the state information of the vehicle sensed by the sensors connected directly to the main controller 100 itself, and the wheel information (e.g., wheel speed, tire pressure, and the like) from the local controllers 210, 220, 230 and 240 that perform data communication with the main controller 100.

Then, the main controller 100 creates a brake control signal and a suspension control signal using the received state information and wheel information of the vehicle (S120).

Subsequently, the main controller 100 outputs the created brake control signal to the brake control unit 110 and the engine control unit 120, and outputs the suspension control signal to the local controllers 210, 220, 230 and 240 through the interface unit 300 (S130).

According to the brake control signal outputted as such, the brake control unit 110 controls brake pressure of each wheel, and the engine control unit 120 controls the value of engine torque.

Next, the local controller 210, 220, 230 and 240 will be described with reference to FIG. 4 that will be explained later.

In this manner, the brake apparatus and the suspension apparatus can be controlled in consideration of the information of the main controller and the local controllers. Accordingly, information required by the respective controllers can be used without redundantly installing sensors needed for the respective controllers, thereby reducing production costs and simplifying the system.

Figure 4:
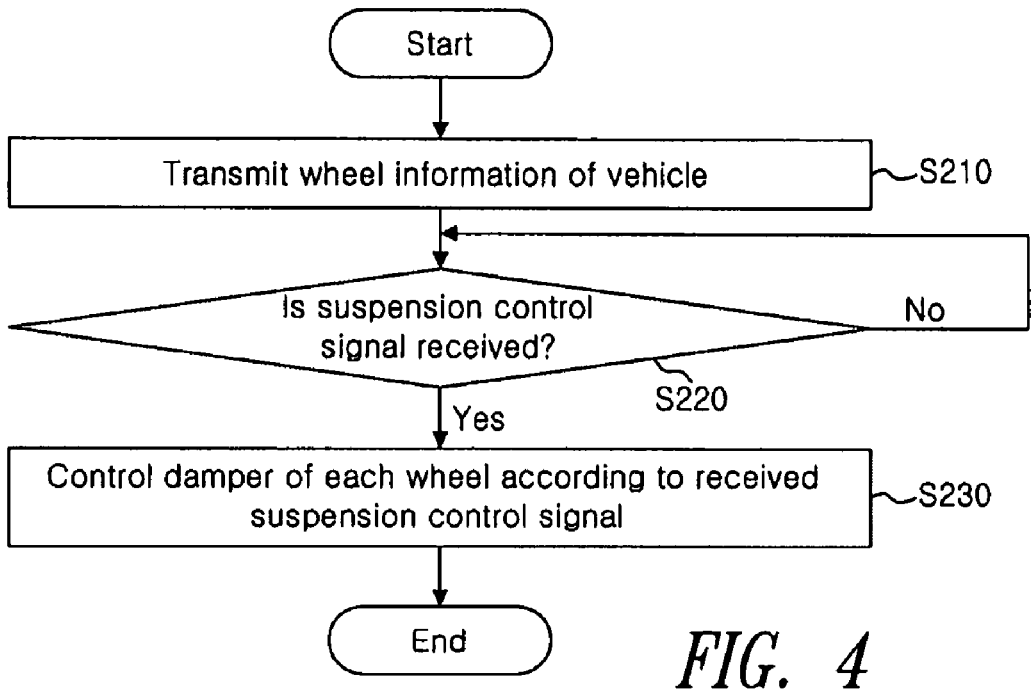
FIG. 4 is a flowchart illustrating a control method of local controllers in the electronic control system for a vehicle according to an embodiment of the present invention.

FIG. 4 is a flowchart illustrating a control method of the local controllers in the electronic control system for a vehicle according to an embodiment of the present invention.

Referring to FIG. 4, the local controllers 210, 220, 230 and 240 sense wheel information of the vehicle from the sensors connected directly to the local controllers 210, 220, 230 and 240 themselves, and transmit the wheel information to the main controller 100 through the interface unit 300 (S210).

Then, the local controllers 210, 220, 230 and 240 determine whether a suspension control signal is received from the main controller 100 (S220).

If it is determined in step S220 that a suspension control signal is not received from the main controller 100, the local controllers 210, 220, 230 and 240 maintain a stand-by state for a certain period of time.

If it is determined in step S220 that a suspension control signal is received from the main controller 100, the local controllers 210, 220, 230 and 240 control the dampers of the respective wheels according to the received suspension control signal (S230).

Accordingly, without additional installation of a CDC controller, the main controller can control the dampers through the local controllers that receive the suspension control signal. Therefore, production costs can be reduced.

According to embodiments of the present invention described above, there are advantages in that communication is made between the main controller and at least one local controller to control a brake apparatus and a suspension apparatus in consideration of information of the controllers, thereby further improving and activating unique features of the respective controllers.

Further, according to embodiments of the present invention described above, since information required by the respective controllers is shared and a brake control signal and a suspension control signal are created and outputted using the information, production costs of the system can be minimized and the system can be simplified.

That is, since sensors are not installed redundantly in the main controller and the local controllers and a CDC controller for controlling the dampers is not installed, production costs can be reduced and the system can be simplified.

Furthermore, according to embodiments of the present invention described above, since tire pressure information inputted from a local controller close to a tire pressure sensor is received, there is an advantage in that the efficiency of a receiving rate can be improved.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The present invention is not limited to the embodiments described above and those skilled in the art can make various modifications and changes thereto. The modifications and changes fall within the spirit and scope of the present invention defined by the appended claims.

The invention claimed is:

1. An electronic control system for a vehicle including a brake apparatus and a suspension apparatus, the electronic control system comprising:

a main controller operable to receive vehicle information and create and output a brake control signal and a suspension control signal for the vehicle;

first, second, third and fourth tire pressure sensors, each operable to sense and communicate tire pressure information of a corresponding wheel;

first, second, third and fourth wheel speed sensors, each operable to sense and communicate wheel speed information of a corresponding wheel;

first, second, third, and fourth local controllers, each in electrical communication with the main controller and with corresponding tire pressure and wheel speed sensors, the local controllers each configured to output respective tire pressure and wheel speed information to the main controller, each local controller being operable to control a damper of a corresponding wheel according to the suspension control signal outputted from the main controller; and an interface unit configured to communicate data between the main controller and the first, second, third, and fourth local controllers, respectively; and a display unit in electrical communication with the main controller and operable to display the tire pressure information communicated to the display unit by the main controller.

2. The system as claimed in claim 1 wherein the main controller communicates to the first, second, third, and fourth local controllers, the suspension control signal determined by using state information of the vehicle received from a variety of sensors of the vehicle and the wheel information of the vehicle received from the first, second, third, and fourth local, controllers, and the first, second, third and fourth local controllers control the damper according to the suspension control signal received from the main controller.

3. A control method of an electronic control system for a vehicle including a brake apparatus and a suspension apparatus, the method comprising the steps of:

communicating to a main controller state information of the vehicle from a sensor connected to the main controller;

communicating to the main controller tire pressure information of a corresponding wheel sensed by a tire pressure sensor and wheel speed information of a corresponding wheel sensed by a wheel speed sensor, from respective first, second, third, and fourth local controllers directly in communication with respective tire pressure and wheel speed sensors; and creating and outputting from the main controller, a brake control signal and a suspension control signal for the vehicle based on the communicated vehicle state, and tire pressure and wheel speed information, to the first, second, third, and fourth local controllers to control a damper of the corresponding wheels; and displaying the tire pressure information sensed by the tire pressure sensors and communicated from the first, second, third, and fourth local controllers on a display unit.

4. An electronic control system for a vehicle including a suspension apparatus, the electronic control system comprising:

a plurality of local controllers, each associated with a corresponding wheel of the vehicle;

a plurality of tire pressure sensors, each in direct electronic communication with a corresponding one of the plurality of local controllers and operable to sense and communicate tire pressure information of the corresponding wheel to the corresponding local controller;

a plurality of wheel speed sensors, each in direct electronic communication with a corresponding one of the plurality of local controllers and operable to sense and communicate wheel speed information of the corresponding wheel to the corresponding local controller; and a main controller in electronic communication with the plurality of local controllers and operable to receive respective tire pressure and wheel speed information from each local controller, and to create and communicate a suspension control signal to the local controllers, each local controller controlling a damper of the corresponding wheel according to the suspension control signal.

\* \* \* \* \*